United States Patent [19]

Takahashi et al.

[11] Patent Number: 5,249,753
[45] Date of Patent: Oct. 5, 1993

[54] PHOTOGRAPHIC FILM CASSETTE

[75] Inventors: Koichi Takahashi; Kiichiro Kitagawa, both of Kanagawa, Japan

[73] Assignee: Fuji Photo Film Co., Ltd., Kanagawa, Japan

[21] Appl. No.: 755,191

[22] Filed: Sep. 5, 1991

[30] Foreign Application Priority Data

Sep. 6, 1990 [JP] Japan .................. 2-238000
Jan. 31, 1991 [JP] Japan .................. 3-31662

[51] Int. Cl.$^5$ .............................................. G03B 17/26
[52] U.S. Cl. ..................................... 242/71.1; 242/71.8
[58] Field of Search .................... 242/71, 71.1, 71.7, 242/71.8, 71.9, 195, 77.3; 354/275; 352/72, 75, 78 R

[56] References Cited

U.S. PATENT DOCUMENTS

| | | | |
|---|---|---|---|
| 2,336,278 | 12/1943 | Mihalyi | 242/71 |
| 2,360,255 | 10/1944 | Mihalyi | 242/71 |
| 2,364,381 | 12/1944 | Mihalyi | 242/71 |
| 2,521,935 | 9/1950 | Monroe | 242/71 |
| 2,552,200 | 5/1951 | Mihalyi | 242/71.1 |
| 3,467,340 | 9/1969 | Rosenburgh | 242/197 |
| 3,556,435 | 1/1971 | Wangerin | 242/192 |
| 3,627,229 | 12/1971 | Wangerin | 242/192 |
| 3,627,230 | 12/1971 | Wangerin | 242/195 |
| 3,677,495 | 7/1972 | Villers et al. | 242/195 X |
| 3,677,499 | 7/1972 | Wangerin | 242/192 |
| 3,797,777 | 3/1974 | Hosono et al. | 242/197 |
| 4,834,306 | 5/1989 | Robertson et al. | 242/71.1 |
| 4,848,693 | 7/1989 | Robertson | 242/71.1 |
| 4,875,637 | 10/1989 | Beach | 242/71.1 |
| 4,875,638 | 10/1989 | Harvey | 242/71.1 |
| 4,883,235 | 11/1989 | Niedospial, Jr. | 242/71.1 |
| 4,887,776 | 12/1989 | Niedospial, Jr. et al. | 242/71.1 |
| 4,899,948 | 2/1990 | Niedospial, Jr. et al. | 242/71.1 |
| 4,908,641 | 3/1990 | Fairman | 242/195 X |

FOREIGN PATENT DOCUMENTS 2921379 11/1980 Fed. Rep. of Germany .

Primary Examiner—Daniel P. Stodola
Assistant Examiner—John P. Darling
Attorney, Agent, or Firm—Sughrue, Mion, Zinn, Macpeak & Seas

[57] ABSTRACT

A photographic film cassette where rotation of a spool causes a film leader to advance to an exterior of a cassette shell from a film chamber through a film passageway. A pair of flanges are provided on both ends of the spool. Round ridges formed on inside surfaces of the flanges are in contact with edges of an outermost convolution of a roll of film. The roll of film is thereby prevented from loosening. A plurality of radially extending slits formed on the flanges in a radial manner divides the flanges into sections. The resistance of the flanges is reduced when the flanges are spread for releasing the film leader by spreaders. In another preferred embodiment, a plurality of holes or openings is formed on the flanges in order to reduce the resistance of the flanges against a spreading force for releasing the film leader.

27 Claims, 13 Drawing Sheets

PHOTOGRAPHIC FILM CASSETTE

BACKGROUND OF THE INVENTION

The present invention relates to a photographic film cassette, more particularly to a film cassette in which rotation of the spool causes the film leader to advance to an outside of the cassette shell through a film passageway.

DESCRIPTION OF THE RELATED ART

It is known to provide a film cassette having a film leader that does not initially protrude from, but is contained in, a cassette shell, and is thus easily loaded in a camera. Rotation of a spool therein by means of a film initial advance mechanism of the camera in the direction of unwinding the photographic film causes the film leader to advance to the exterior of the cassette shell through a film passageway of the film cassette. Such a film cassette is disclosed in U.S. Pat. No. 4,899,948. In such a cassette, flanges of the spool are provided with circular projections or lips formed on their circumference for projecting toward each opposite flange so as to prevent a roll of film wound on the spool from loosening.

It is necessary in this film cassette to release the photographic film from contact with the circular lips by spreading or bending the flanges outwardly in the axial direction around a film entrance defined between the film passageway and a film chamber inside the cassette shell, because the circular lips cover and press lateral edges of the outermost convolution of the roll of film.

The film chamber is provided with spreading members for spreading the flanges at a position close to the entrance of the film passageway. If formed right on the entrance of the film passageway, the spreading members would be an obstacle to advancing the film leader because of contact with a leading end of the film. The spreading members are thus formed at a position somewhat remote from the entrance. Friction between the spreading members and the flanges is a problem because the degree of bending the flanges in contact with the spreading members is necessarily large. Thus, the necessary torque applied to the spool for rotation is increased, so that the battery of the camera is quickly discharged.

SUMMARY OF THE INVENTION

It is therefore an object of the present invention to provide a photographic film cassette in which rotation of a spool causes a film leader to easily and smoothly advance to the exterior of a cassette shell.

In order to achieve the above and other objects of the present invention, a pair of flanges is provided on ends of the spool. An arcuate lip is formed on an inside wall of at least one of the flanges so as to project toward the photographic film and contact with lateral edges of an outermost convolution of said photographic film in order to prevent the film from loosening. A plurality of slits or openings is formed on at least one of the flanges for splitting the circumference of the flange effectively into a plurality of sections so as to allow the flange to be easily deformed in an outward direction so as to release the outermost convolution of the photographic film from the arcuate lip.

Rotation of the spool can easily and smoothly cause a film leader to advance to the outside of a cassette shell. Accordingly, the necessary torque applied to the spool for rotation is relatively low and the camera battery will last longer. In addition, a more compact drive system can be utilized in the camera.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS

Figure 1:
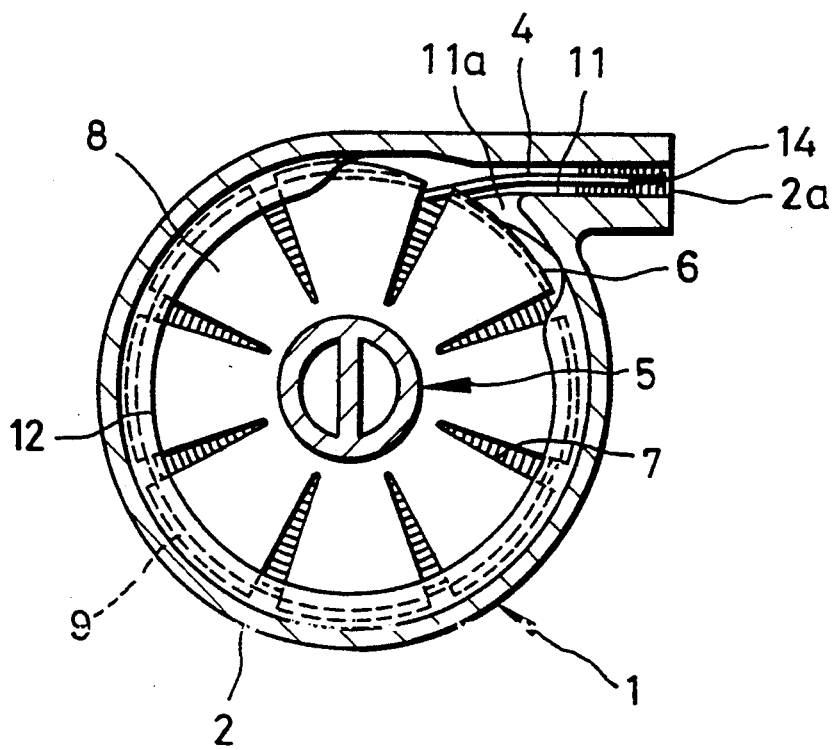
FIG. 1 is a sectional side view illustrating an important portion of a photographic film cassette according to a first preferred embodiment of the present invention.
Figure 2:
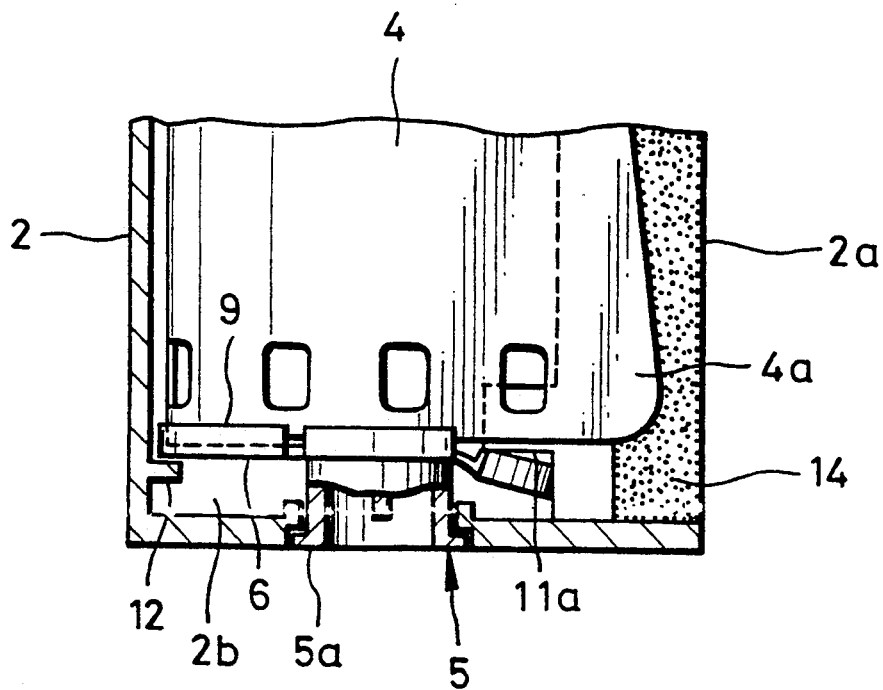
FIG. 2 is a transverse sectional view, partially cutaway, illustrating a state of spreading flanges of a spool of the film cassette illustrated in FIG. 1.
Figure 13:
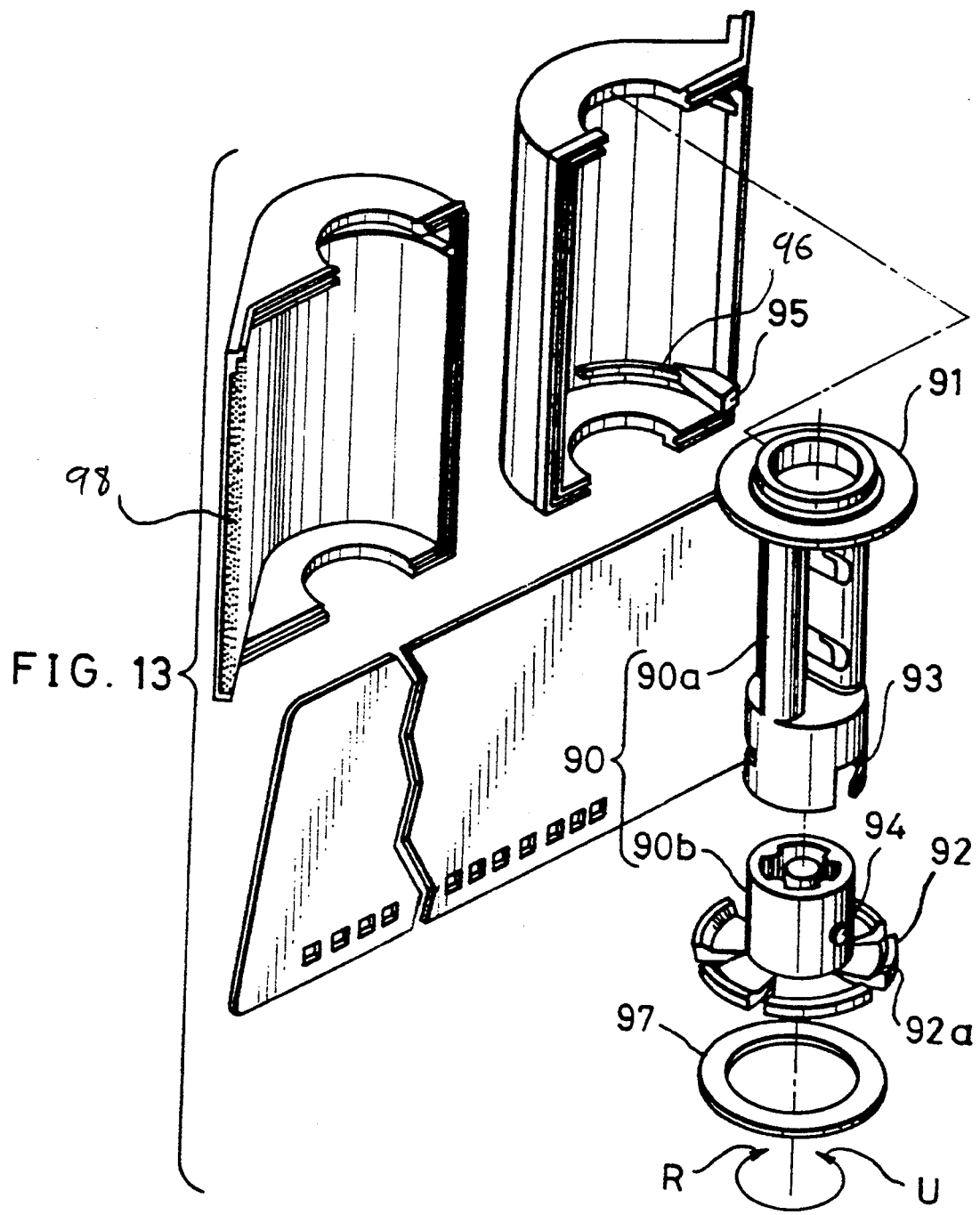
FIG. 13 is an exploded perspective view illustrating the flange of the subject invention of a spool incorporated in a conventional film cassette.

FIGS. 1 and 2 illustrate photographic film cassette 1 in accordance with a first preferred embodiment of the present invention. Cassette shell 2 provided with film passage mouth 2a rotatably contains spool 5 with photographic film 4 wound thereon. A pair of flanges 6 formed integrally with spool 5 are split by slits 7 into a plurality of flange segments, e.g. eight in the first preferred embodiment. The edges of flange segments 8 corresponding to the circumference of flanges 6 are provided with arcuate lips 9 extending in a direction toward each opposite flange so as to engage with the lateral sides of the outermost convolutions of photographic film 4 wound in a roll in order to prevent the roll of film 4 from loosening. The arcuate lips are illustrated in FIG. 13 in perspective.

A circumferential wall of cylindrical film chamber 2b of cassette shell 2 is provided with round ridges 12 for preventing flange segments 8 from outward deformation except proximate a film entrance defined between film chamber 2b and film passageway 11, or along a major arc conjugate to a minor arc passing through the film entrance along the circumference of film chamber 2b. The entrance of film passageway 11 is provided with guide projections 11a for spreading flange segments 8 toward the exterior through contact with arcuate lips 9 so as to release the lateral sides of photographic film 4 from arcuate lips 9, and for separating film leader portion 4a having an inclined leading end from the roll of film 4 toward film passage mouth 2a. Plush 14, for trapping light, is attached to film passage mouth 2a. Ends 5a of spool 5 are formed in the shape of an annular collar in order to prevent external light from entering film chamber 2b through bearing holes, for spool 5, thereabout.

The operation of the above-constructed film cassette 1 is now described. When loaded in a camera, spool 5 is rotated in a film unwinding direction by a film initial advance mechanism of the camera. Although photographic film 4 would be loosened then, flange segments 8 are prevented from being bent outwardly by round ridges 12 except around the entrance between film chamber 2b and film passageway 11. Arcuate lips 9 of flange segments 8 press both edges of the outermost convolutions of the roll of film 4 so as to transmit the rotation of spool 5 to film leader portion 4a without further loosening of the roll of film 4. Therefore, film leader portion 4a is rotated clockwise along with the roll of film 4. Because round ridges 12 do not reach the entrance of film passageway 11, film leader portion 4a is released by releasing the lateral edges of photographic film 4 from flange segments 8, which are pressed outwardly by guide projections 11a. When spool 5 is rotated, film leader 4a is separated from the inner roll of film 4 by guide projections 11a, passes thereon, and is advanced through film passageway 11 out of film passage mouth 2a.

Figure 3:
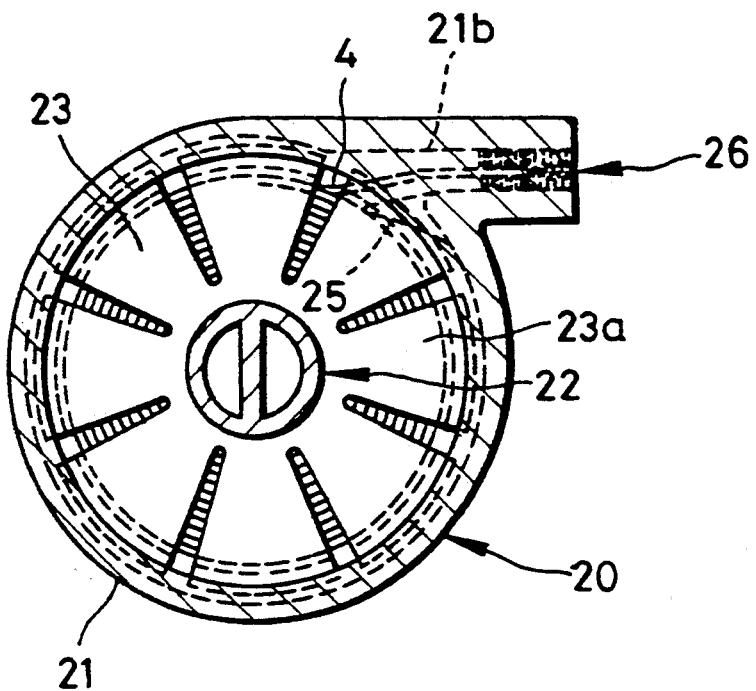
FIGS. 3 and 4 are sectional views illustrating a film cassette according to a second preferred embodiment.
Figure 4:
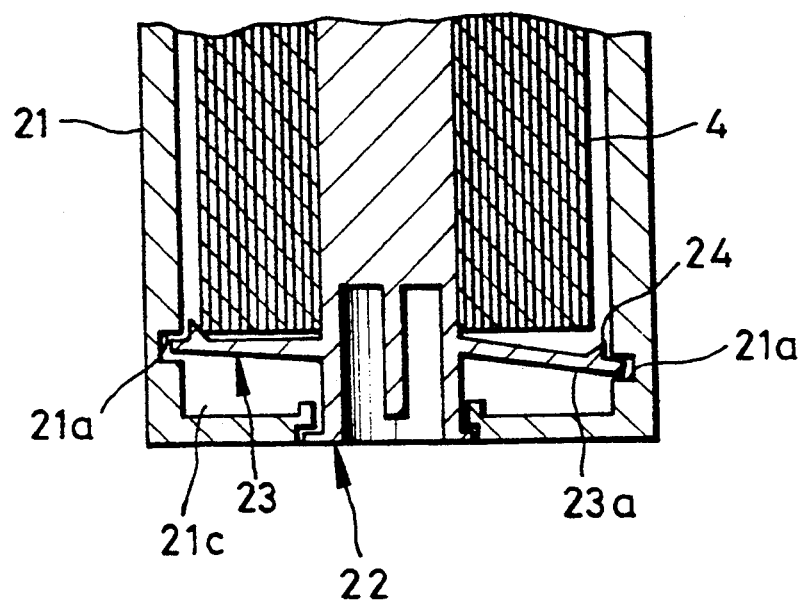

In FIGS. 3 and 4 illustrating film cassette 20 according to the second preferred embodiment, a pair of flanges 23 of spool 22 provided in cassette shell 21 are split into a plurality of flange segments 23a much like the first embodiment. The circumferential edges of flange segments 23a extend toward the circumferential wall of film chamber 21c inside cassette shell 21 from the position of forming arcuate lips 24, and are freely inserted in guide groove 21a formed on the circumferential wall of film chamber 21c.

Guide groove 21a is formed in the shape so as to separate from photographic film 4 near film passageway 21b, thus bending each flange segment 23a outward at this point. Guide groove 21a is shaped close to photographic film 4 at points remote from an entrance of film passageway 21b so as to keep each flange segment 23a undeformed at these positions. Accordingly, the lateral edges of photographic film 4 are in contact with arcuate lips 24 to prevent the roll of film 4 from loosening except around the entrance of the film passageway 21b. The rotational force of spool 22 thus is transmitted to the outermost convolutions of the roll of film 4. Film leader portion 4a is released in the vicinity of the entrance of film passageway 21b, guided to film passageway 21b by a separating claw 25, and let out of film passage mouth 26.

Figure 5:
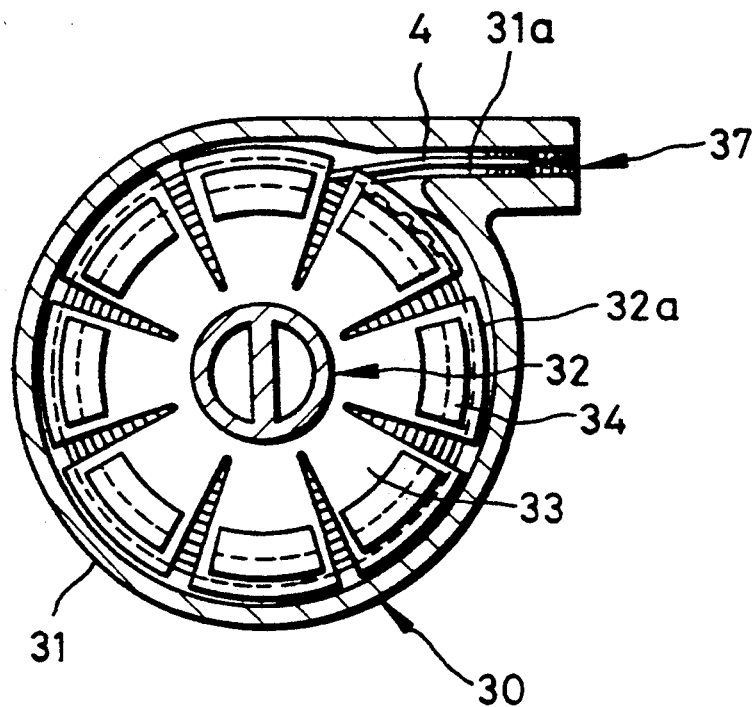
FIGS. 5 and 6 are sectional views illustrating a film cassette according to a third preferred embodiment.
Figure 6:
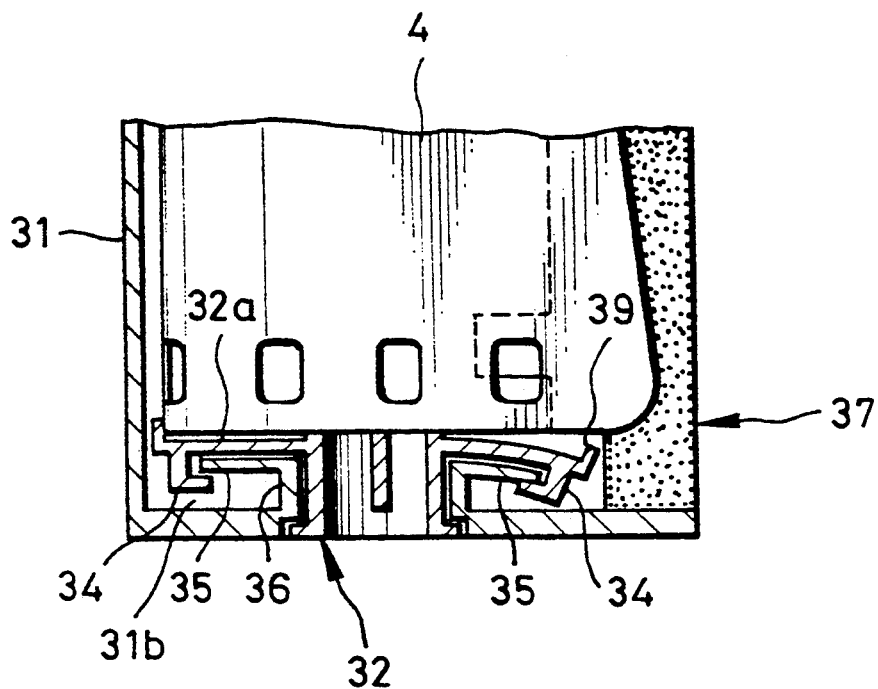

In FIGS. 5 and 6, illustrating a film cassette 30 according to a third preferred embodiment, engaging portions 34 are formed on respective flange segments 33 of flanges 32a. Guide members 35 to be engaged with engaging portions 34 project from around bearing holes 36 of cassette shell 31 for spool 32 so as to extend from spool 32.

Guide members 35 are formed in film chamber 31b so as to extend vertically from spool 32 at all positions except near an entrance of film passageway 31a defining film passage mouth 37. At this position, corresponding to film passage mouth 37, guide members 35 are curved toward lateral walls of film chamber 31b. Accordingly, flange segments 33 are guided by the guide members 35 so that arcuate lips 39 formed on the circumferential edges of flange segments 33 are in contact with both lateral edges of photographic film 4 so as to prevent the roll of film 4 from loosening at all positions remote from film passageway 31a. On the other hand, flange segments 33 are bent outwardly by guide members 35 so as to release film leader 4a in the vicinity of film passageway 31a.

Figure 7:
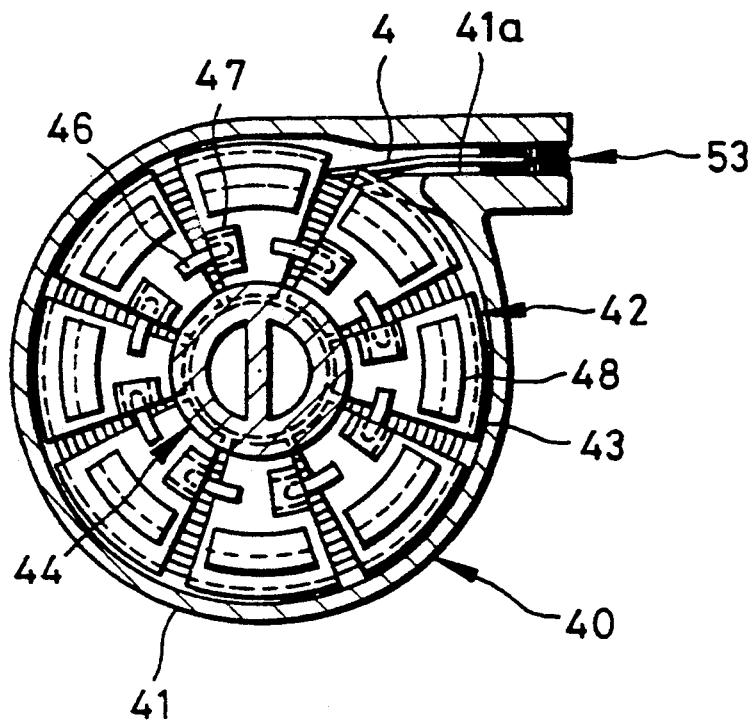
FIGS. 7 and 8 are sectional views illustrating a film cassette according to a fourth preferred embodiment.
Figure 8:
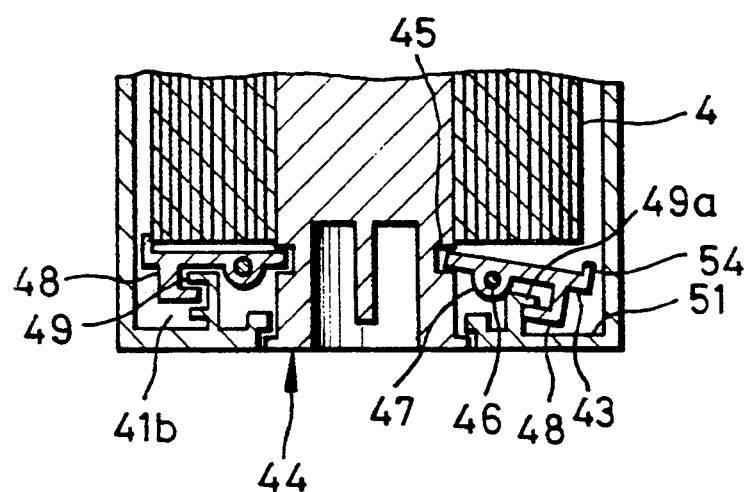

In FIGS. 7 and 8 illustrating film cassette 40 according to a fourth embodiment, a pair of flanges 42 consists of a doughnut-like connection of a plurality of separate sector pieces 43. Spool 44 is provided with groove 45, in which the inside edges of sector pieces 43 are inserted so as to mount sector pieces 43 rotatably on spool 44. The back surface of each sector piece 43 is provided with a pin portion 46 and a hole 47 for connecting one sector piece to another. Pin portion 46 of one of sector pieces 43 is freely inserted in hole 47 of an adjacent one of sector pieces 43 so as to effect a removable connection. Engaging portions 48 are formed on the respective sector pieces 43. Guide members 49 are engaged with engaging portions 48 and project from lateral walls 51 of film chamber 41b of cassette shell 41 so as to define a position along an axial direction taken by the sector pieces 43. The tip of guide members 49 is provided with bent portion 49a to be engaged with engaging portions 48. The distance between bent portions 49a and the lateral walls 51 is predetermined so as to be shorter proximate an entrance of film passageway 41a connected to film passage mouth 53, and longer at other positions around the periphery of film chamber 41b. The friction between arcuate lips 54 formed on the sector pieces 43 and photographic film 4 is larger than that of guide members 49 and the engaging portions 48, so that rotation of spool 44 causes flanges 42 to rotate so as to advance film leader portion 4a outwardly. When the outermost convolution of the roll of film 4 is released from arcuate lips 54 after advancing film leader portion 4a, flanges 42 stop rotating whereas the spool 44 still rotates. The lateral edges of photographic film 4 are in contact with the arcuate lips 54 to prevent the roll of film 4 from loosening except near an entrance of film passageway 41a. Sector pieces 43 are inclined by the guide members 49 in the vicinity of film passageway 41a so as to release film leader 4a.

Figure 9:
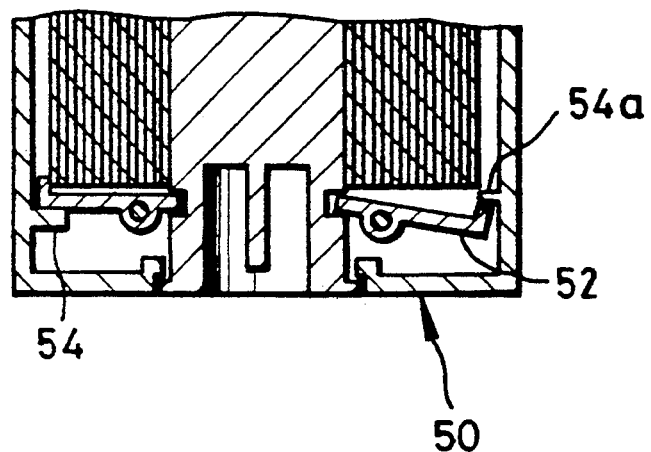
FIG. 9 is a transverse sectional view illustrating a state of spreading flanges of a spool of the film cassette according to a modification of the embodiment illustrated in FIGS. 7 and 8.

Although the position taken by sector pieces 43 is defined by engaging portions 48 and guide members 49 in the former embodiment, film cassette 50 of a fifth embodiment illustrated in FIG. 9 has round ridges 54 similar to those in FIG. 1 for defining positions of sector pieces 52. Spreading ridges 54a incline sector pieces 52 in the vicinity of a film passageway (not illustrated) in a manner similar to guide groove 21a in FIG. 4.

Figure 10:
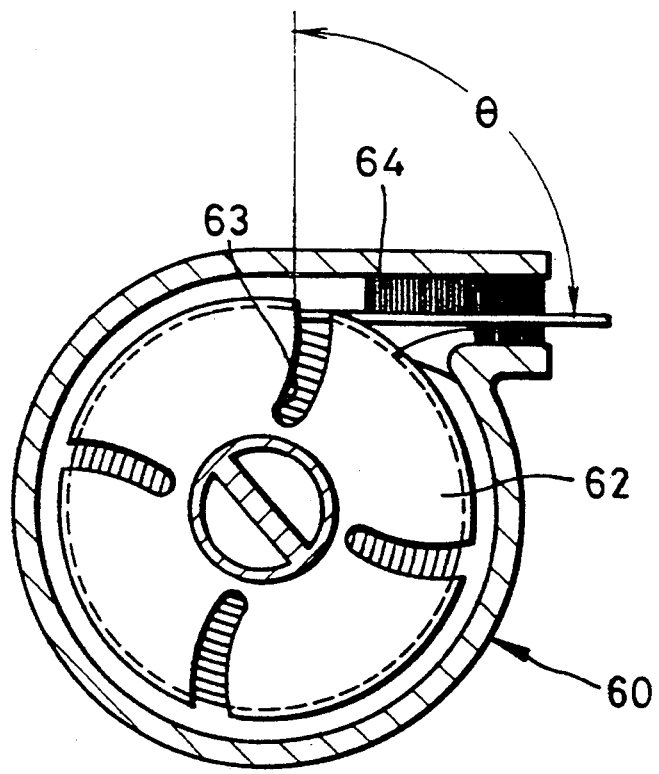
FIG. 10 is a sectional side view illustrating another example of splitting the flanges of a spool of the subject invention.

Film cassette 60 of a sixth embodiment, illustrated in FIG. 10, is provided with flanges 62 having slits 63 in a different shape. The angle θ between slits 63 and photographic film 4 is preferably 90°±5° in an entrance between film passageway 64 and a film chamber in order to advance photographic film 4 straight toward film passageway 64. The width of slits 63 is preferably 0.2 to 2 mm, whereas the number of the slits 63 is preferably from 2 to 24.

Figure 11:
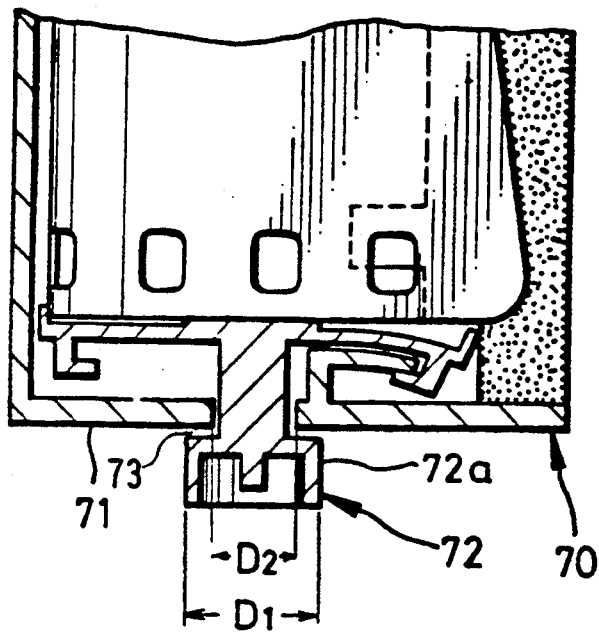
FIGS. 11 and 12 are transverse sectional views illustrating examples of shielding light form bearing holes for the spool of the subject invention.
Figure 12:
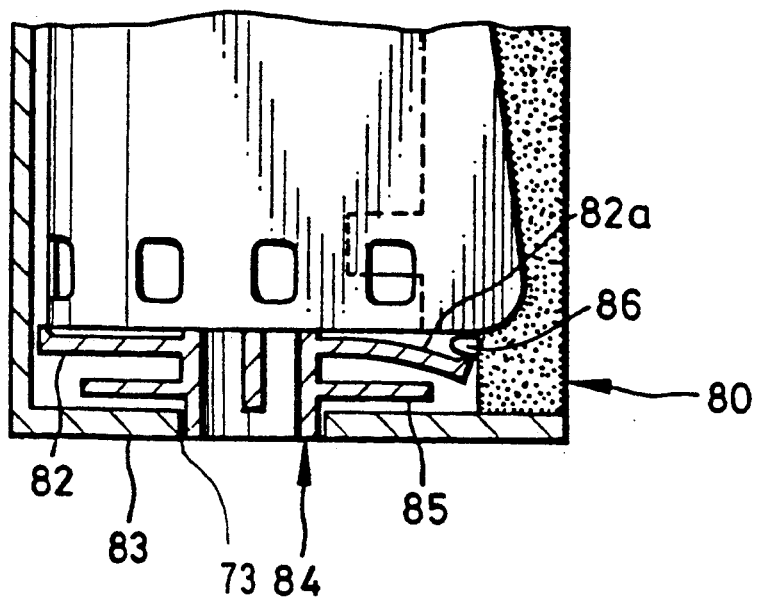

In the film cassettes of the former embodiments, the flanges are split in order to reduce a torque necessary for deforming or spreading the flanges. However, in such a design, light may be incompletely shielded from entering the bearing holes of the spool as compared with a conventional film cassette comprising unsplit flanges. This problem is solved by providing a construction such as annular collars 5a of spool 5 coupled with steps of the bearing holes in the embodiment of FIG. 1, but can be also solved by constructions illustrated in FIGS. 11 and 12. In film cassette 70 of the seventh embodiment, illustrated in FIG. 11, ends 72a of spool 72 project from cassette shell 71. Outer diameter $D_1$ of ends 72a is formed so as to be larger than diameter $D_2$ of bearing holes 73 to maximize light-shielding in bearing holes 73. In film cassette 80 of the eighth embodiment, illustrated in FIG. 12, light-shielding brims 85 are formed integrally with spool 84 between flanges 82 and lateral walls 83. A spreader 86 outwardly deforms flange segments 82a of flanges 82 so as to release photographic film 4 from flanges 82.

Figure 14:
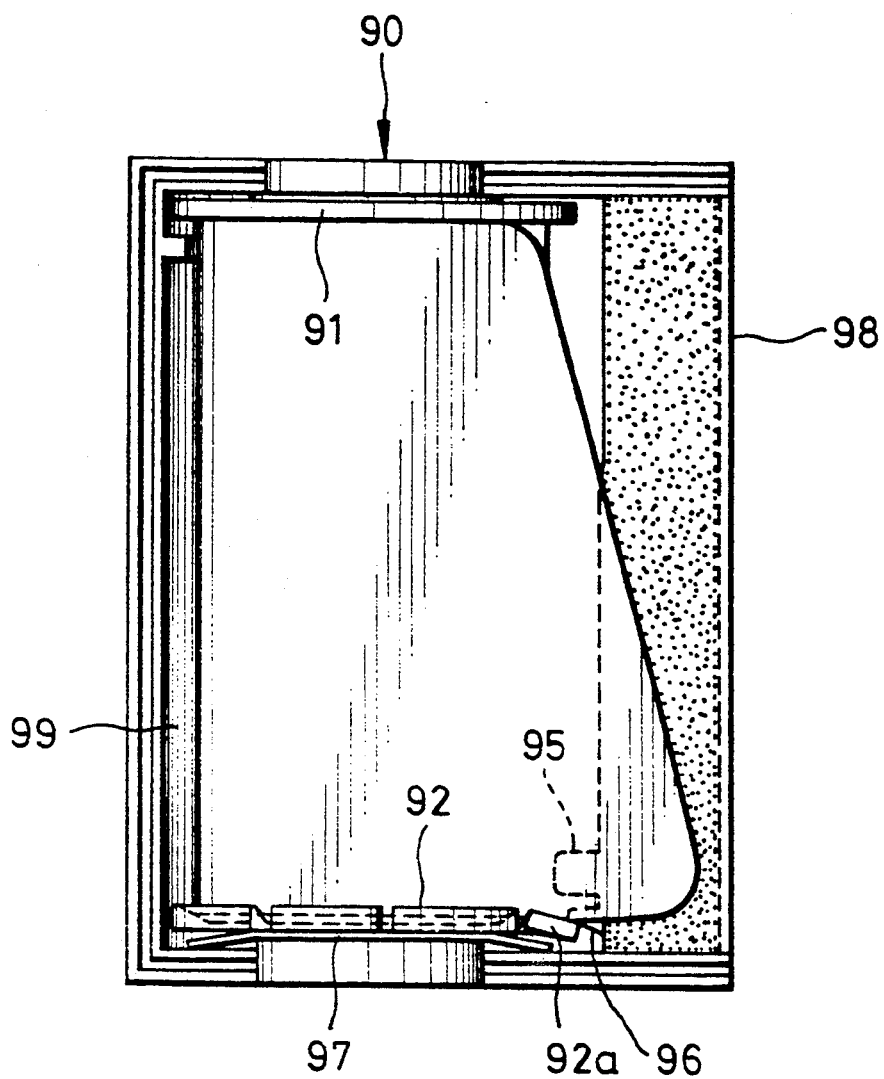
FIG. 14 is a plan view illustrating the film cassette illustrated in FIG. 13 in a state where an upper shell half is removed.

It is noted that the present invention is applicable to a film cassette such as is disclosed in U.S. Pat. Nos. 4,887,776 and 4,899,948, in which rotation of a spool causes a film leader to advance to an outside of a cassette shell. FIGS. 13 and 14 illustrate a film cassette of a construction similar to that disclosed in U.S. Pat. No. 4,887,776 with the present invention applied thereto. Spool 90 consists of two spool pieces 90a and 90b which are in relative slidable contact with each other by virtue of cam ramp 93 and pin 94 so as to change a distance between flanges 91 and 92 when they are rotated relative to each other. Lower flange 92 is split in a plurality of flange segments 92a according to the present invention. Spreader 96 is provided next to separating claw 95 inside film chamber 99 for deforming flange segments 92a of flange 92 so as to release photographic film 4 from flange segments 92a.

When spool 90 is rotated in the film unwinding direction indicated by the arrow U, the distance between flanges 91 and 92 is shortened by virtue of cooperation of cam ramp 93 and pin 94 so as to rotate the roll of film 4 without loosening in a state clamped from both lateral sides. Flange 92 is also pressed by spring-washer 97 toward flange 91 so that photographic film 4 is clamped more tightly. Film leader portion 4a is released by releasing lateral edges of the photographic film 4 from flange segments 92a, which are pressed outward by spreader 96. When spool 90 continues to be rotated, film leader portion 4a is separated from the inner roll of film 4 by separation claw 95, passes thereon, and is advanced through a film passageway out of film passage mouth 98.

Figure 15:
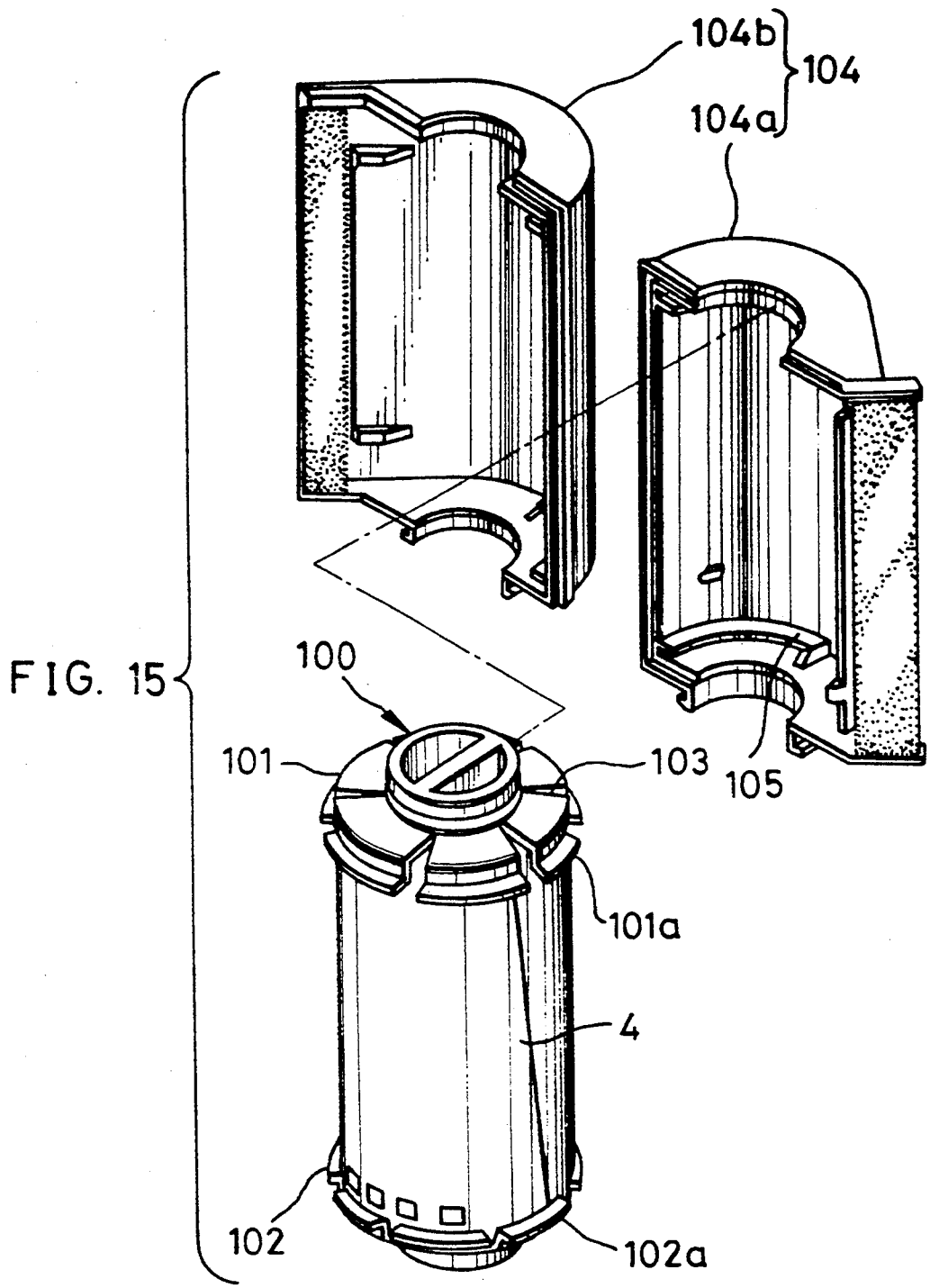
FIGS. 15 and 16 illustrate the flange of the subject invention of a spool incorporated in another conventional film cassette.
Figure 16:
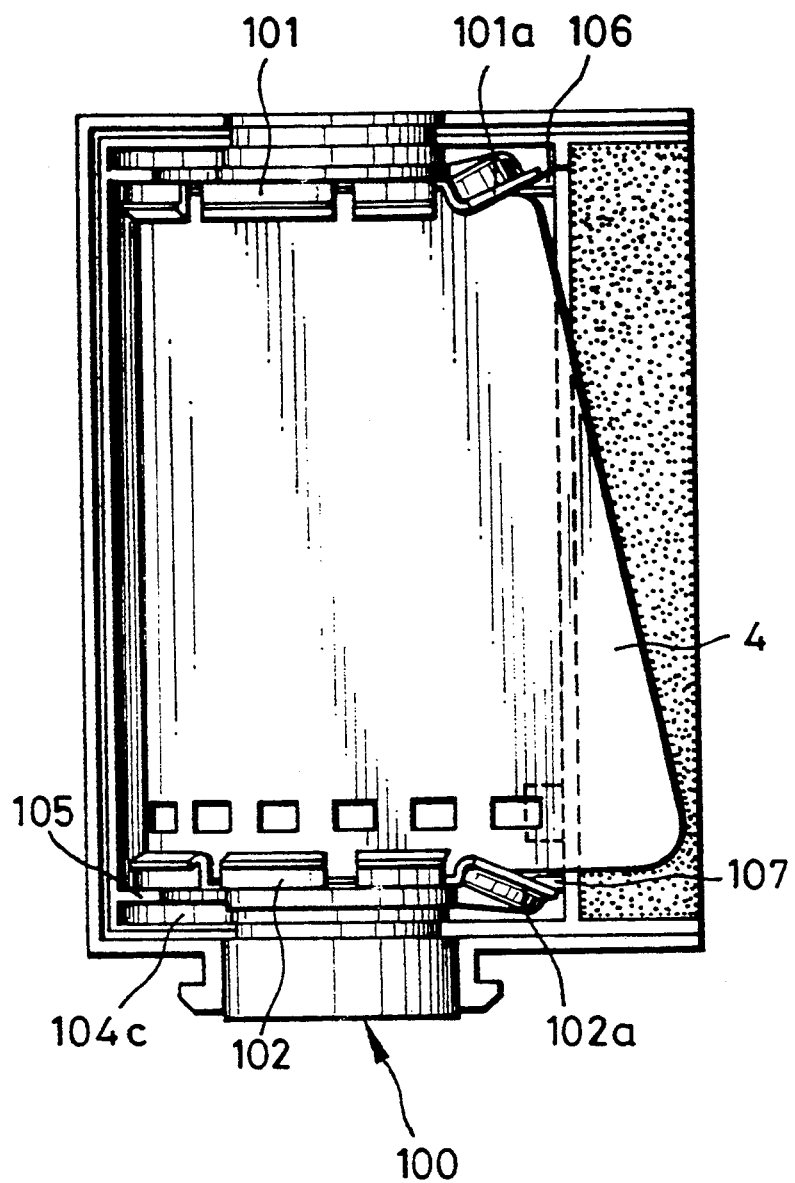

Referring to FIGS. 15 and 16 illustrating a film cassette of a construction similar to U.S. Pat. No. 4,899,948 with the present invention applied thereto, flanges 101 and 102 of spool 100 are split by a plurality of, e.g., six slits 103. Circumferential edges of flanges 101 and 102 are bent inwardly so as to cover the edges of the roll of film 4, and then project toward a circumferential wall of film chamber 104c of cassette shell 104, which is constructed by joining two shell halves 104a and 104b together. Circumferential edges 101a and 102a, projecting from flanges 101 and 102, are prevented from deformation by round ridge 105, and are to be in contact with spreaders 106 and 107, formed in film chamber 104c, for releasing film leader portion 4a from round ridge 105 by bending flanges 101 and 102 outwardly near the film passageway. Film leader portion 4a can be advanced to the outside with a torque even smaller than a conventional film cassette.

Figure 17:
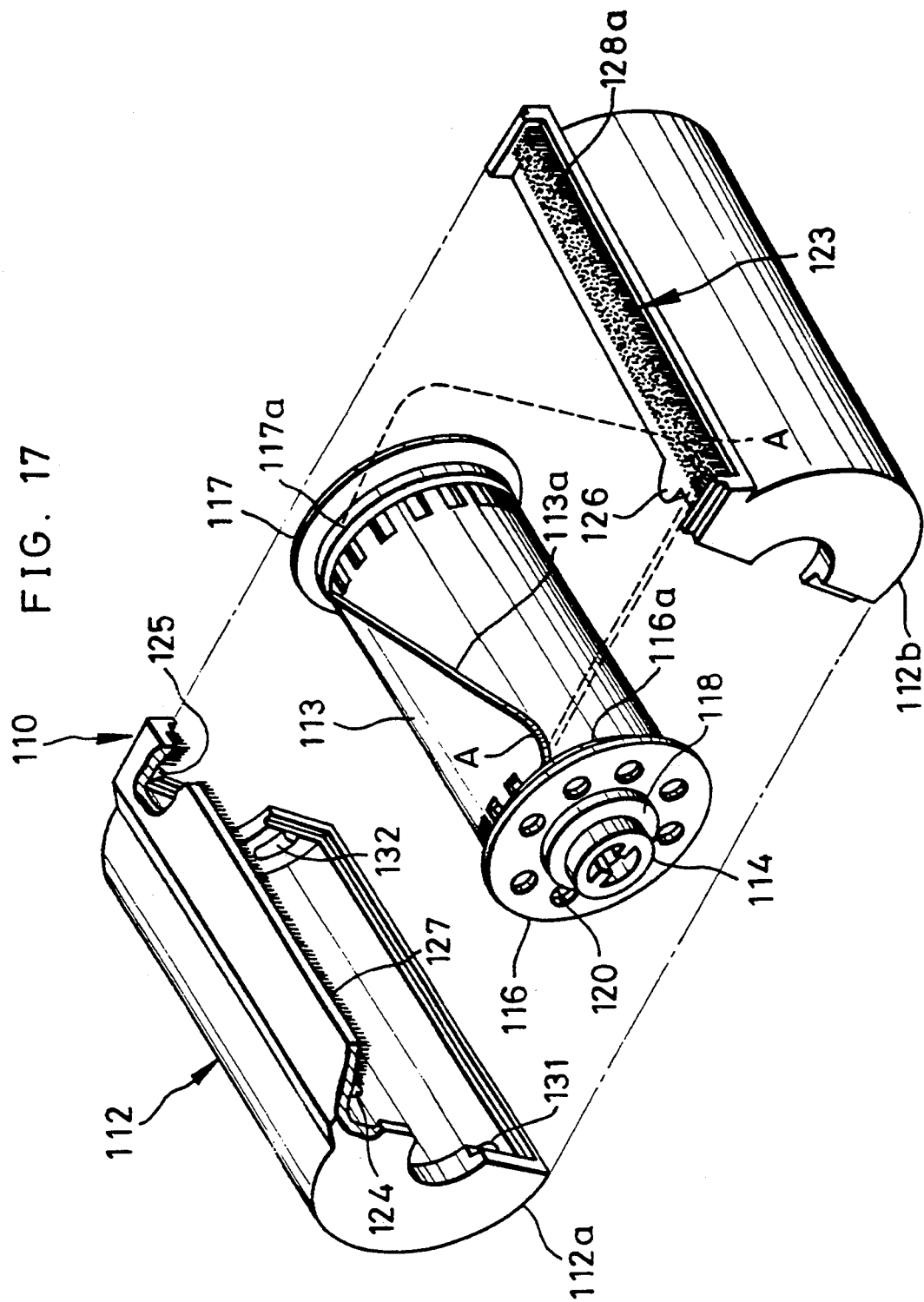
FIG. 17 is an exploded perspective view illustrating a film cassette according to a fifth preferred embodiment.
Figure 18:
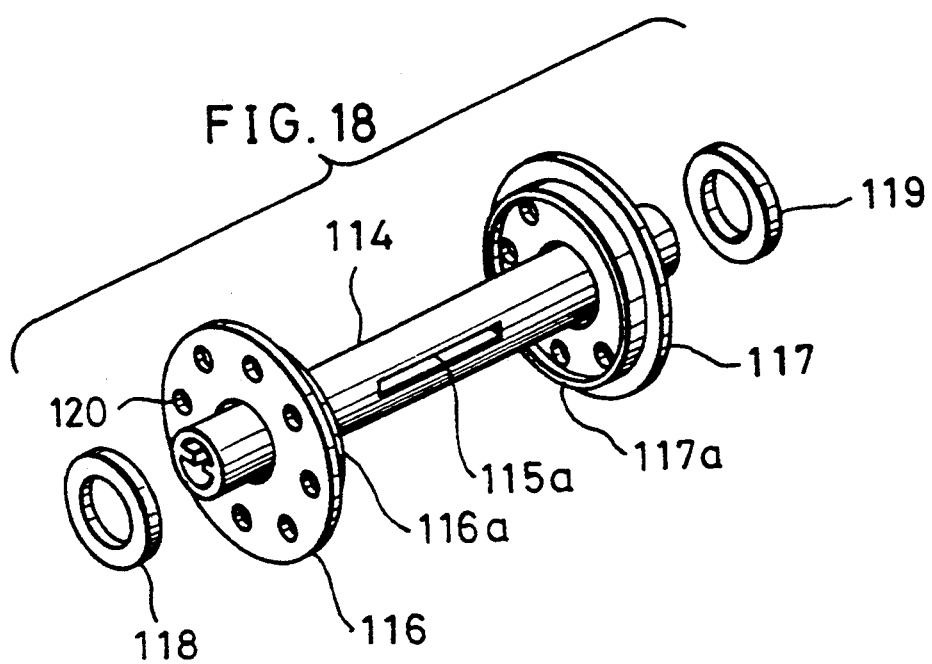
FIG. 18 is an exploded perspective view illustrating a spool of the film cassette illustrated in FIG. 17.

Referring to FIG. 17 illustrating yet another preferred embodiment, film cassette 110 consists of a cassette shell 112 constructed from a pair of shell halves 112a and 112b and spool 114 contained rotatably therein with photographic film 113 wound in a roll. A pair of flanges 116 and 117, molded from a plastic material, are freely mounted on spool 114 as illustrated in FIG. 18. Washers 118 and 119 are fitted on spool 114, outside the flanges 116 and 117 to shield light from spacings around spool 114 in the bearing holes of the cassette shell 112.

Figure 19:
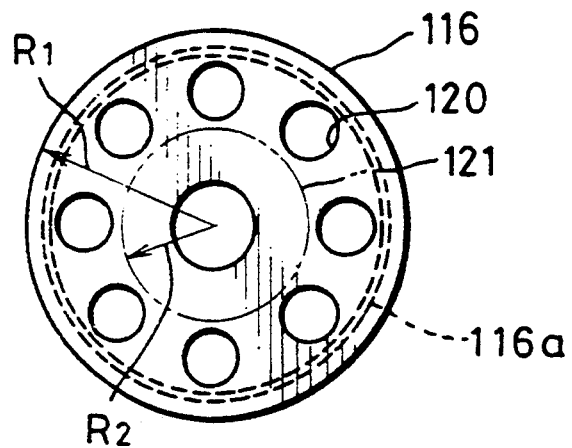
FIG. 19 is a plan view illustrating a flange of the spool illustrated in FIG. 18.

As illustrated in FIG. 19, a plurality of circular holes 120 are formed on each of flanges 116 and 117, so as to increase the elasticity of flanges 116 and 117 without affecting slipping characteristics thereof. Accordingly, no particular material, having high elasticity and slipping characteristics, is required. Holes 120 also serve to save the amount of plastic utilized, thereby reducing the cost of manufacturing the film cassette. It is preferable to form holes 120 in the outside of a circle (indicated by the two-dot-dash line) coaxially with flanges 116 and 117, having a radius R half as long as a radius $R_2$ of flanges 116 and 117, and to determine the total area of holes 120 to be 30% or more of the whole flange.

The inside walls of flanges 116 and 117 are provided with circular lips 116a and 117a positioned so as to face one another for contact with edges of the roll of film 113 so as to prevent the roll of film 113 from loosening. The radius of circular lips 116a and 117a are designed to be smaller than $R_1$, the radius of flanges 116 and 117, of which the circumference projects from circular lips 116a and 117a. Slit 115a is formed on the middle of the spool 114 for inserting and fixing a trailing end of photographic film 113.

With shell halves 112a and 112b joined together, film passage mouth 123 is formed therebetween for passing leading end 113a of photographic film 113. Triangular spreaders 124 and 125 are formed integrally with cassette shell 112a, for contact with circumferential edges of flanges 116 and 117 from their inside so as to deform flanges 116 and 117 in the widthwise direction of the photographic film 113, thereby releasing leading end 113a of photographic film 113 from circular lips 116a and 117a. Shell half 112b is provided with separating claw 126 positioned in correspondence with tip portion A of the inclined leading end 113a for separating tip portion A from the inner roll of film 113 so as to advance to film passage mouth 123. Light trapping members 127 and 128 are attached to both upper and lower surfaces inside film passage mouth 123 to prevent light form entering cassette shell 112. The lateral wall of the film chamber formed in shell halves 112a and 112b is provided with round ridges 131 and 132 at all positions remote from the vicinity of the film passageway for contact with the outside surfaces of flanges 116 and 117 so as to prevent the roll of film 113 from loosening.

The operation of film cassette 110 as constructed above will be described now. When film cassette 110 is loaded in a camera, spool 114 is rotated in the film unwinding direction by a film initial advance mechanism incorporated in the camera. Although photographic film 113 begins to loosen, the lateral edges of film leading end 113a are pressed by circular lips 116a and 117a, because flanges 116 and 117 are in such a contact with round ridges 131 and 132 except in the vicinity of the film passageway so as to prevent flanges 116 and 117 from being spread outward. The roll of film 113 is not further loosened, so that the rotation of spool 114 is transmitted to leading end 113a, which is thus rotated in the film unwinding direction together with the roll of film 113.

Round ridges 131 and 132 do not extend to the vicinity of the film passageway. The spreaders 124 and 125 spread the circumferential edges of flanges 116 and 117 outward to release the lateral edges of the roll of film 113. When spool 114 is further rotated, leading end 113a is separated from the inner convolutions of photographic film 113 by separating claw 126 without jamming, then passes on the upper surface of separating claw 126, and is advanced out of film passage mouth 123.

An experiment was conducted on the inventive film cassette 110. Flanges 116 and 117 are molded from polyethylene (PE). The torque applied for initially advancing the film leader was measured. The measured value of torque was 260 g•cm in this film cassette, much smaller than a torque 450 g•cm measured from a conventional film cassette under the same condition.

Figure 20:
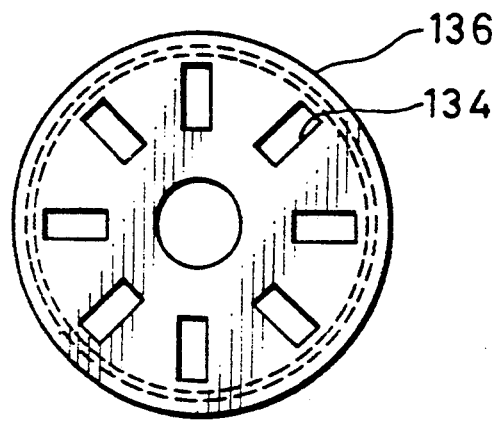
FIGS. 20 and 21 are plan views illustrating other examples of the flange illustrated in FIG. 19.
Figure 21:
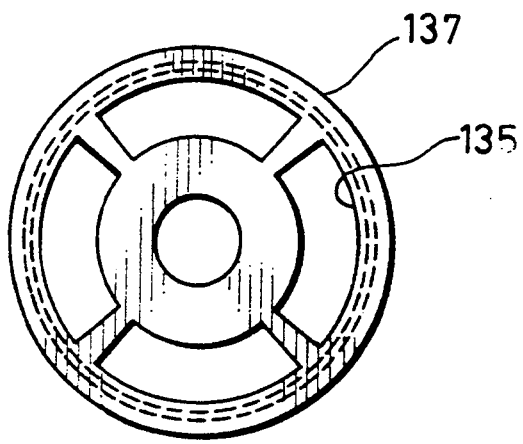

Examples of openings different in the shape from the holes 120 formed on the flanges 116 and 117 are illustrated in FIGS. 20 and 21. Openings 134 illustrated in FIG. 20 are formed in the rectangular shape on flanges 136, whereas openings 135 illustrated in FIG. 20 are formed on flanges 137 in the shape of a partial area of a sector defined between two coaxial arcs, which openings 134 and 135 cause flanges 136 and 136 to have a larger elasticity.

Figure 22:
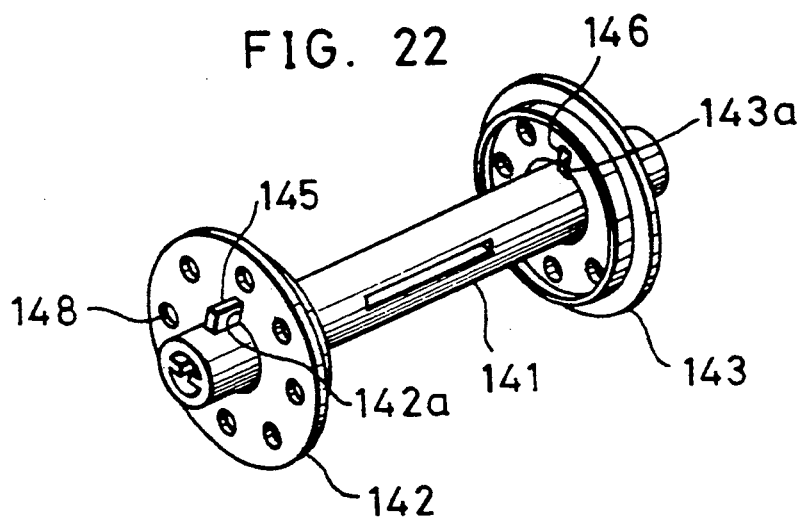
FIGS. 22 and 23 are perspective views illustrating other examples of the spool illustrated in FIG. 18.
Figure 23:
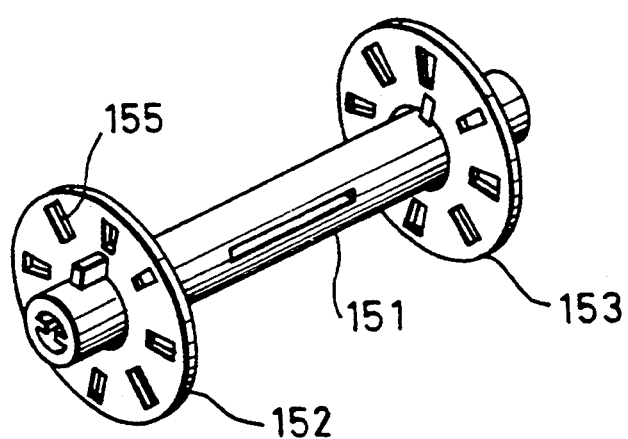

Spools different in a construction from the spool 114 are described referring to FIGS. 22 and 23. Spool 141 illustrated in FIG. 22 is designed to rotate in synchronism with flanges 142 and 143. Elongated projections 145 and 146 are formed on spool 141 near both ends. Guide grooves 142a and 143a corresponding to elongated projections 145 and 146 are formed on flanges 142 and 143. Circular holes 148 are formed on flanges 142 and 143 to make the flanges more elastic.

Spool 151, illustrated in FIG. 23, is also designed to rotate in synchronism with flanges 152 and 153 in a manner similar to spool 141. The roll of film is prevented from loosening by clamping its lateral edges between flanges 152 and 153 without forming circular lips on flanges 152 and 153. Rectangular openings 155 are formed on flanges 152 and 153 to increase elasticity.

It is noted that the holes may be formed on flanges formed integrally with a spool. In all the above embodiments, circular lips on flanges may be deformed and spread by lateral edges of the advancing film leader of the photographic film, instead of spreading members specialized for deformation.

Although the present invention has been fully described by way of the preferred embodiments thereof with reference to the accompanying drawings, various changes and modifications will be apparent to those having skill in this field without departing from the scope of the present invention as recited in the appended claims.

What is claimed is:

1. A photographic film cassette including a cassette shell, a spool rotatably contained in said cassette shell, and photographic film wound about said spool, a film leader portion of said film advancing outside said cassette shell, from a film chamber within said cassette shell, through a film passageway formed in said cassette by rotating said spool in a direction of unwinding said photographic film, said cassette comprising:

a flange provided at each end of said spool;

an arcuate lip formed on an inside wall of at least one of said flanges, said lip extending toward said photographic film so as to engage with lateral edges of an outermost convolution of said photographic film in order to prevent said photographic film from loosening;

a guide projection formed in said film chamber proximate said film passageway, said guide projection being engaged with at least one of said flanges so as to deform portions of said flange which are proximate said film passage way in an outward direction away from said film;

a round ridge formed in said film chamber and extending along a circumference of said film chamber so as to engage with portions of said flange which are remote from said film passageway and prevent deformation of portions of said flange which are remote from said film passageway;

said flanges having a plurality of slits formed therein so as to divide at least a circumferential portion of said flanges into a plurality of sections so as to increase the elastic deformability of said flanges so that said flanges may be easily urged in an outward direction so as to release said engagement of said outermost convolution of said photographic film with said arcuate lip.

2. A photographic film cassette including a cassette shell, a spool rotatably contained in said cassette shell, and photographic film wound about said spool, a film leader portion of said film advancing outside said cassette shell, from a film chamber within said cassette shell, through a film passageway formed in said cassette by rotating said spool in a direction of unwinding said photographic film, said cassette comprising:

a flange provided at each end of said spool;

an arcuate lip formed on an inside wall of at least one of said flanges, said lip extending toward said photographic film so as to engage with lateral edges of an outermost convolution of said photographic film in order to prevent said photographic film from loosening;

a guide groove formed in said film chamber in inclination with respect to a circumference of said film chamber so as to engage with said flange so as to deform portions of said flange which are proximate said film passageway in an outward direction away from said film and so as to prevent deformation of portions of said flange which are remote from said film passageway.

3. A photographic film cassette including a cassette shell, a spool rotatably contained in said cassette shell, and photographic film wound about said spool, a film leader portion of said film advancing outside said cassette shell, from a film chamber within said cassette shell, through a film passageway formed in said cassette by rotating said spool in a direction of unwinding said photographic film, said cassette comprising:
- a flange provided at each end of said spool, said flanges comprising a plurality of separate sector members rotatably fitted on said spool, a salient pin formed on each of said sector members and a hole formed in each of said sector members for receiving said pin of an adjacent sector member in order to connect said sector members to each other;
- an arcuate lip formed on an inside wall of at least one of said flanges, said lip extending toward said photographic film so as to engage with lateral edges of an outermost convolution of said photographic film in order to prevent said photographic film from loosening;
- means for deforming said flanges in an outward direction away from said film in said film chamber at portions of said flange which are proximate said film passageway; and
- means for preventing deformation of said flanges at portions thereof which are remote from said film passageway.

4. A photographic film cassette as claimed in claim 3, wherein said deforming means and said deformation preventing means comprises a guide member formed in said film chamber and engaging portions formed on said sector members, said engaging portions being engaged with said guide member.

5. A photographic film cassette as claimed in claim 3, wherein said deforming means comprises a spreading projection formed in said film chamber and said deformation preventing means comprises a circumferential projection formed on an inner surface of said film chamber and extending along a circumference of said film chamber.

6. A photographic film cassette including a cassette shell, a spool rotatably contained in said cassette shell, and photographic film wound about said spool, a film leader portion of said film advancing outside said cassette shell, from a film chamber within said cassette shell, through a film passageway formed in said cassette by rotating said spool in a direction of unwinding said photographic film, said cassette comprising:
- a flange provided at each end of said spool;
- an arcuate lip formed on an inside wall of at least one of said flanges, said lip extending toward said photographic film so as to engage with lateral edges of an outermost convolution of said photographic film in order to prevent said photographic film form loosening;
- said flanges having a plurality of sits formed therein so as to divide at least a circumferential portion of said flanges into a plurality of sections so as to increase the elastic deformability of said flanges so that said flanges may be easily urged in an outward direction so as to release said engagement of said outermost convolution of said photographic film with said arcuate lip, said slits extending from a circumferential edge of said flanges to a position which is at half the distance from said circumferential edge to the center of said flange.

7. A photographic film cassette including a cassette shell, a spool rotatably contained in said cassette shell, and photographic film wound about said spool, a film leader portion of said photographic film advancing outside said cassette shell, from a film chamber defined within said cassette shell, through a film passageway formed in said cassette by rotating said spool in a direction of unwinding said photographic film, said film cassette comprising:
- a flange provided at each end of said spool, said flange comprising separate sector members which are individually rotatably fitted on said spool.

8. A photographic film cassette as defined in claim 7, further comprising:
- a salient pin portion formed on each of said sector members; and
- a hole formed on each of said sector members for receiving said pin portion of an adjacent sector member in order to connect said sector members.

9. A photographic film cassette as defined in claim 8, further comprising:
- a guide member formed in said film chamber for displacing said sector members in an axial direction of said spool; and
- engaging portions formed on said respective sector members for being engaged with said guide member so as to constitute said flange deforming means and said deformation preventing means.

10. A photographic film cassette as defined in claim 8 wherein:
- said flange deforming means is a first, spreading projection formed in said film chamber; and
- said deformation preventing means is a second projection formed on an inner surface of said film chamber along and extending a circumference of said film chamber.

11. A photographic film cassette as defined in claim 7, wherein an end of said spool projects from a bearing hole formed in said cassette shell outwardly to an exterior portion of said cassette shell, and a diameter of said end of said spool is larger than a diameter of said bearing hole so as to prevent light from entering said film chamber through a bearing hole of said cassette shell.

12. A photographic film cassette as defined in claim 7, further comprising:
- a brim, for preventing light from entering said film chamber through a bearing hole of said cassette shell, said brim being disposed in a position between at least one of said flanges and an interior lateral wall of said film chamber.

13. A photographic film cassette as defined in claim 7, wherein said spool includes two spool pieces, which are provided respectively with said flanges, lateral edges of an outermost convolution of said photographic film being clamped between said flanges when film leader portion is initially advanced through said film passageway.

14. A photographic film cassette as defined in claim 13, wherein an arcuate lip is formed on an inside portion of at least one of said flanges, said lip is provided with a tapered surface so that a thickness of said at least on flange increases along a radial direction thereof from a central portion toward circumferential edge thereof.

15. A photographic film cassette including a cassette shell, a spool rotatably contained in said cassette shell, and photographic film wound about said spool, a film leader portion of said photographic film advancing outside said cassette shell, from a film chamber defined within said cassette shell, through a film passageway formed in said cassette by rotating said spool in a direction of unwinding said photographic film, said film cassette comprising:
- a flange provided at each end of said spool;

an arcuate lip formed on an inside wall of at least one of said flanges, said lip extending toward said photographic film, said lip having a tapered surface so that a thickness of said at least one of said flanges increases along a radial direction thereof from a central portion toward a circumferential edge of said at least one of said flanges.

16. A photographic film cassette including a cassette shell, a spool rotatably contained in said cassette shell, and photographic film wound about said spool, a film leader portion of said photographic film advancing outside said cassette shell, from a film chamber defined within said cassette shell, through a film passageway formed in said cassette by rotating said spool in a direction of unwinding said photographic film, said film cassette comprising:

a pair of flanges provided on ends of said spool;
a projection formed on said spool and extending along an axial direction of said spool; and
guide grooves formed in said flanges so as to extend from center holes formed in said flanges, ends of said spool being inserted in said center holes, said guide grooves being engaged with said projection.

17. A photographic film cassette as claimed in claim 16 wherein, said flanges have openings formed therein.

18. A photographic film cassette as defined in claim 17, wherein said openings are formed outside of a circle which is concentric with said flanges, said circle having a radius half as long as a radius of said flanges.

19. A photographic film cassette as defined in claim 17, wherein said openings are circular holes.

20. A photographic film cassette as defined in claim 17, wherein said openings are of a rectangular shape.

21. A photographic film cassette as defined in claim 17, wherein said openings are of an arcuate shape.

22. A photographic film cassette as defined in claim 17, wherein said openings slits are which extend radially along said at least one flange.

23. A photographic film cassette as defined in claim 22, wherein said slits are of a curved shape.

24. A photographic film cassette as defined in claim 23, wherein an angle $\theta$, defined respectively between said slits and said film passageway when ends of slits, which are proximate a periphery of said flange, are located proximate a film entrance of said film passageway, is between 85° and 95°.

25. A photographic film cassette as defined in claim 16, wherein a round ridge for pressing said flanges, so as to clamp said photographic film, is formed on lateral walls of said film chamber, at positions remote from said film passageway, so as to surround said spool.

26. A photographic film cassette as defined in claim 16, wherein arcuate lips, for engaging with lateral edges of an outermost convolution of said photographic film in order to prevent said photographic film from loosening, are formed on inside walls of said flanges so as to extend toward said photographic film.

27. A photographic film cassette as defined in claim 16, wherein a total area of said plurality of openings of each of said flanges is equal to at least 30% of a total area of a corresponding area of said flanges.

* * * * *